Figure 1:
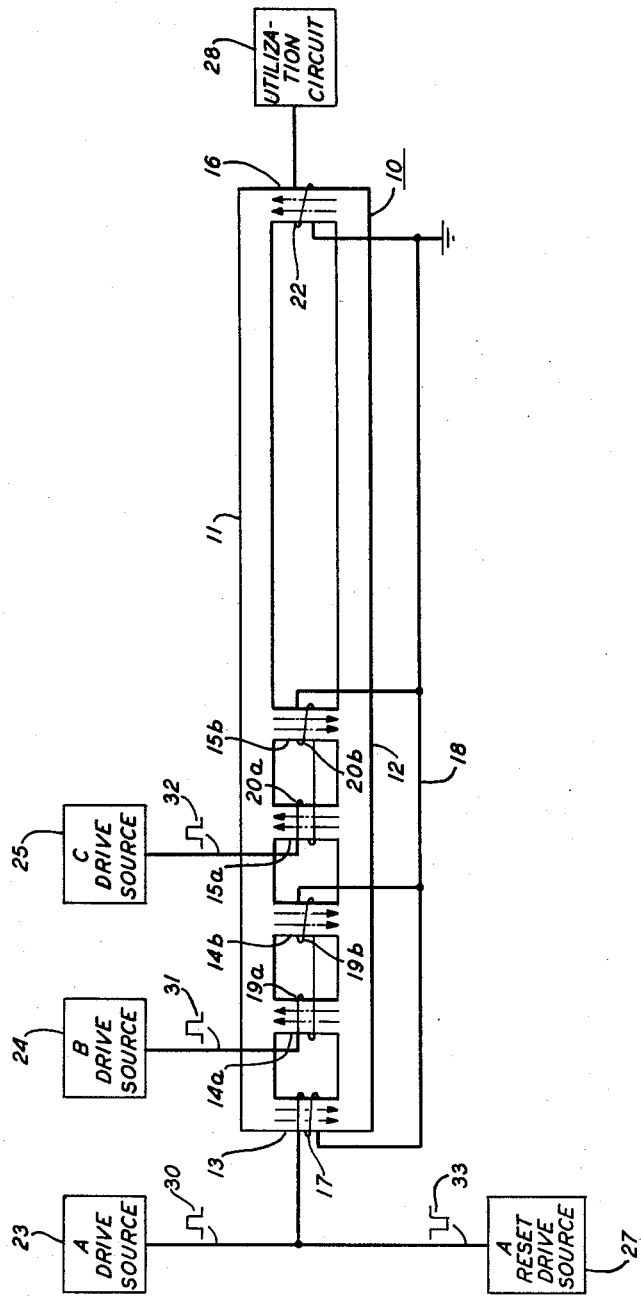

May 26, 1964

D. E. CARLSON ETAL 3,134,909

MAGNETIC CONTROL CIRCUITS

Filed Aug. 5, 1959

2 Sheets-Sheet 1

INVENTORS D. E. CARLSON
P. MALLERY
BY
William H. Kamstra
ATTORNEY

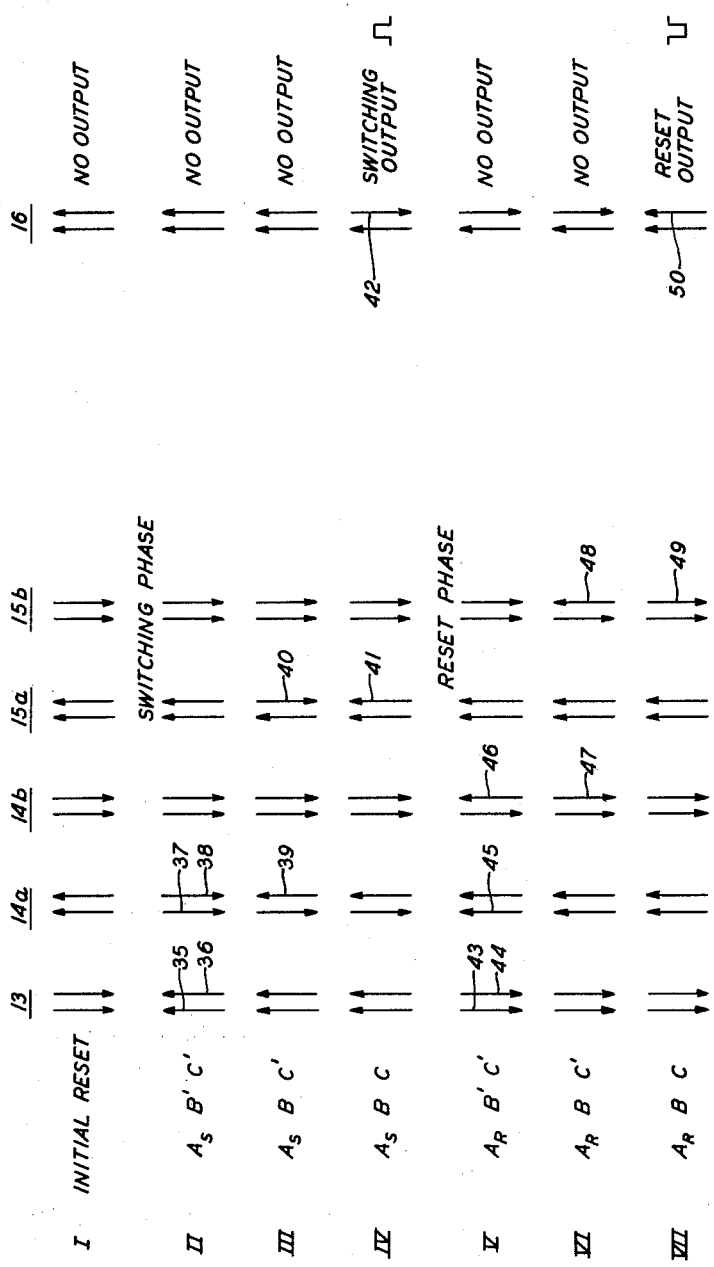

United States Patent Office 3,134,909
Patented May 26, 1964

3,134,909
MAGNETIC CONTROL CIRCUITS
David E. Carlson, Hazlet, and Paul Mallery, Union, N.J., assignors to Bell Telephone Laboratories, Incorporated, New York, N.Y., a corporation of New York
Filed Aug. 5, 1959, Ser. No. 831,775
11 Claims. (Cl. 307—88)

This invention relates to electrical switching circuits and particularly to such circuits in which magnetic elements are employed to control the generation of output signals.

The use of square loop magnetic elements, particularly toroidal magnetic cores and the like, to serve as control devices for the switching of electrical signals is well known in the electrical arts. The capability of such elements to remain in a particular condition of remanent magnetization to which driven by an applied magnetomotive force has been widely exploited to realize various and numerous control circuits in which electrical signals are selectively switched. Thus, for example, logic circuits, access circuits, commutator circuits, and counter circuits, to name a few, all have been represented in the toroidal core circuitry. A departure from the well-known toroidal core element, and one with which many of the foregoing specific switching circuits may be more advantageously achieved, is described by T. H. Crowley and U. F. Gianola in a copending application Serial No. 732,549, filed May 2, 1958, now Patent No. 2,963,591 issued December 6, 1960. A magnetic structure is there described having a general ladder-like configuration to present a plurality of legs connected at either end by a pair of side rails.

The structure accordingly presents a plurality of flux-limited flux paths and, in one embodiment, a flux induced in a leg at one end may be closed through any succeeding leg or legs including the leg at the other end of the structure. In this manner, by coupling an output winding to the latter rung, an output signal may be generated whenever all of the paths defined by the intermediate legs are blocked to the induced flux. In the embodiment described in the copending application referred to, a reset flux distribution is initially induced in the legs and side rails of the structure by means of reset windings linked to each possible flux path. A switching current pulse is subsequently applied only to an input winding coupled to an input end leg to induce a switching flux therein. By applying coincident holding currents to windings linking each possible intermediate flux closing paths, the switching flux is steered to close through the last output leg of the structure to generate the aforementioned output signal. The holding currents maintain the flux in each of the possible intermediate closing paths in a remanent condition thereby effectively closing these paths to the closure of additional flux therethrough or to the closure of a switching flux. In the basic configuration described in the above copending application, only a single drive input is effective to cause a switching of flux in the output leg and thereby generate an output signal. A separate reset circuit energized after each switching operation is also required whether or not a proper combination of holding currents was applied to achieve an output signal. This is necessary each time to prepare the flux distribution in the structure for a subsequent operation.

A magnetic structure such as briefly described in the foregoing may, according to the principles of the present invention, be advantageously adapted to perform coincident drive switching functions which in the past have been performed by toroidal magentic cores. Arrangements for performing such coincident drive functions in which the latter cores are utilized have laid considerable stress on the maintaining of the partial switching currents within critical limits. Frequently any variation in such currents may cause an unselected core to switch or prevent a selected core from switching. The problems presented by the necessarily narrow margins of the partial currents making up the total switching drive in many cases limit the number of such coincident currents for practical purposes to two. Thus, a greater flexibility in the number of coincident drive currents and the sequence of their application has hitherto been obtainable only at the cost of more complicated and expensive external current supply circuitry.

An object of the present invention is to provide a new and novel switching circuit in which an output may be generated by means of applied coincident drive currents without regard to the number of the individual coincident currents making up the total drive without adding to the cost or complexity of external current sources.

Another object of this invention is to accomplish a switching operation in a magnetic control structure by means of a particular combination of applied coincident currents without regard to previous switching operations performed by other combinations of coincident currents.

Still another object of this invention is to provide a magnetic control device in which both a switching and a reset operation may be performed under the control of applied coincident energizing currents.

A still further object of this invention is to provide a new and novel magnetic flux-control switching device.

The foregoing and other objects of this invention are achieved in one specific illustrative embodiment thereof comprising a ladder-like magnetic structure in which a pair of side rails connect at either ends a plurality of transverse rungs or legs. The structure is advantageously fabricated in a unitary construction of any magnetic material well known in the art displaying substantially rectangular hysteresis characteristics. The various elements of the structure are organized in accordance with the known magnetic principle that an induced flux will be closed through an available path offering the least reluctance. In this connection, flux closure paths between what may be designated as switching legs of the structure need be maintained in no particular uniformity in length. A path between a last of the switching legs and an output leg is, however, in one embodiment, made substantially longer than the longest flux path existing between the switching legs to permit a flux preference between paths of different reluctances. A structure having a pluraltiy of apertures therein with one aperture substantially larger than the sum of the other apertures thus results.

According to one feature of this invention a plurality of input drive circuits are provided. A first input circuit including a source of current pulses is connected to a drive winding coupled to the first leg of the structure alone. Each of succeeding pairs of the switching legs has other drive windings coupled thereto, each of the pairs of drive windings so resulting being connected respectively to other sources of current pulses. The drive windings are coupled to the switching legs in particular senses such that a current pulse on each collectively is required to cause a flux closure around the longest path including the output leg.

Thus it is another feature of this invention that the combination of drive windings are so wound on the switching legs that no combinations of drive inputs less than or different from the particular proper combination, which former combinations may have been applied to the drive windings during preceding operations, will prevent the generating of an output signal when the proper combination of input drives is in fact applied. No reset phase of operation is thus required before an output signal is generated and the circuit is always in readiness during a switching phase for the introduction therein of the proper combination and character of input drive currents.

It is another feature of this invention that, when an output signal has been generated responsive to the application of the proper combination of input drive currents, reset may be accomplished in the same combinatorial manner with another usable output signal being produced during this phase. Except for one of the switching legs of the structure, input drive currents of the same polarity may be advantageously employed during the combinatorial reset phase of operation as were applied during the switching phase. In the specific embodiment being generally described, the reset flux redistribution results from the application to the input drive winding of the first leg of the structure of a coincident current pulse of a polarity opposite to that applied to generate an initial output signal. Means for providing currents of opposite polarity at different times may conveniently be connected to the same input drive winding of the first switching leg.

A coincident drive magnetic flux control device according to the principles of this invention may advantageously find employment in the access circuitry of conventional magnetic core or memory wire information storage matrices. The substantially wider drive current margins permissible with the present invention and the generation of a usable output signal during both a switching and a reset phase of operation will be appreciated as ideally adapting the present control structure for use in connection with coordinate memory arrays, for example. In such coordinate arrays drive currents of opposite polarities are required to energize a particular information address for writing and interrogation. Thus, the output signals generated during the two phases of operation may advantageously be utilized as such write and interrogation currents generally required in such memory arrays.

This invention together with the foregoing objects and features and other advantageous adaptations will be better understood from a consideration of the detailed description thereof which follows when taken in conjunction with the accompanying drawing in which:

FIG. 1 is a schematic presentation of one specific illustrative embodiment of this invention; and FIG. 2 is a flux comparison table showing the distribution and direction of flux in the legs of a core structure according to this invention at various operative stages.

As depicted in FIG. 1, an illustrative embodiment of this invention comprises as its basic control means a magnetic core structure 10 of a material having substantially rectangular hysteresis characteristics. Magnetic materials such as the ferrites displaying these characteristics are well known in the art. The core structure 10 is formed to present a pair of side rails 11 and 12 which connect therebetween a plurality of transverse switching legs 13, 14a, 14b, 15a, and 15b. An output leg 16 is also thus connected by the side rails 11 and 12 at an output end of the structure 10. The switching legs are separated from each other to form a plurality of apertures in the structure 10. The output leg 16 is spaced at a greater distance from the last of the switching legs 15b than that separating the latter switching leg 15b from the first switching leg 13 to form a single, large aperture in the structure 10 for reasons which will appear hereinafter. The minimum cross-sectional areas of the side rails 11 and 12 and the switching legs and output leg are maintained substantially equal for flux limiting purposes.

An input drive winding 17, connected at one end to a ground bus 18, is coupled to the first of the switching legs 13. A pair of serially connected input drive windings 19a and 19b are coupled respectively to the switching legs 14a and 14b, the drive winding 19b being connected at one end to the ground bus 18. Another pair of serially connected input drive windings 20a and 20b are coupled respectively to the switching legs 15a and 15b, the drive winding 20b also being connected at one end to the ground bus 18. An output winding 22 also connected at one end to the ground bus 18 is coupled to the output leg 16.

The other end of the input drive winding 17 is connected to an A source of drive currents 23 and the other ends of each of the drive windings 19a and 20a are connected respectively to similar B and C sources 24 and 25. The drive current sources 23, 24, and 25 may each comprise circuits well-known in the art capable, in the present embodiment, of delivering positive current pulses under the selective control of the system in which the present invention is adapted for use. As will become evident hereinafter, the magnitudes of the positive current pulses produced have only a lower limit and complete uniformity of output current values is thus not required of the drive current sources.

The other end of the input drive winding 17 is also connected to an A reset source of drive currents 27. The latter current source may also comprise a circuit of the character well-known in the art capable of delivering, in this case, a negative current pulse during a reset phase of operation also under the selective control of a parent system. ' The magnitude of the latter current pulse also has only a lower absolute limit for its contribution to a resetting operation. Connected to the other end of the output winding 22 is a utilization circuit 28 which may also comprise a part of the system with which the embodiment being described may be adapted for use. An exemplary and highly advantageous application of the circuit of the present invention is its employment as an access switch for conventional toroidal magnetic core or memory wire storage arrays. Since the details of particular utilization circuits 28 do not properly constitute a part of this invention, they are not specifically shown in the drawing. However, in order to facilitate an understanding of illustrative operations of this invention such an application may be briefly described. One possible mode of operation in connection with storage arrays in which this invention may be employed is to supply the write and interrogation pulses to energizing conductors of a memory array. The utilization circuit 28 could, in such an adaptation comprise, for example, an energizing solenoid coupled to magnetic wire memory elements of a storage array such as is described in the copending application of D. C. Weller, Serial No. 791,230, filed February 4, 1959, now Patent No. 3,000,004 issued September 12, 1961. Each of the energizing solenoids of such a storage array would then be directly coupled to an output leg 16 of a core structure 10. In order to effect a selective generation of an output signal for any particular one of such solenoids, the core structures 10 according to this invention may be organized in groups and subgroups in a well-known manner. A, B, and C drive inputs may then be multiplied to individual core structures 10 so that the coincidence of inputs within any one group can occur at only a single core structure 10 at one time. With the foregoing organization of the details of an illustrative embodiment together with an exemplary adaptation as an access switch to a memory array in mind, illustrative operations of this invention may now be described with particular reference to the flux comparison chart of FIG. 2.

For purpose of describing such operations, it will be assumed that during a prior reset phase of operation, a flux distribution was induced in the switching and output legs of the structure 10 as indicated by the double arrows in each of these legs in FIG. 1. Each arrow is representative of one-half the total flux value capable of being closed through a leg. The direction of the arrows in each case represents the polarity of the flux which may be understood as being completed through the side rails 11 and 12. The initial reset flux alignment in the legs is represented in FIG. 2 by the flux-representative arrows of row I. At this point, it may be recalled that the minimum cross-sectional area of each of the side rails 11 and 12 and of each of the switching and output legs was determined to be substantially equal. As a result, each of the possible closure paths for the flux induced during any phase of operation is flux-limited. Accordingly, when such a path is once saturated no more flux can be closed therethrough and the path is effectively blocked to the passage of any additional flux of the same polarity. Since each of the possible paths is equally flux-limited, a positive control of flux closure in its redistribution during operative phases of the circuit is advantageously provided.

Initially it may be determined from an inspection of FIG. 1 that the energization of any one of the A, B, or C drive sources alone will be ineffective to cause a change in direction of flux in the output leg 16 of the core structure 10. This will be appreciated bearing in mind the known magnetic principle that an induced flux will be completed through a path which offers the least reluctance—in this case, the shortest available path. Thus, the sense of the drive winding 17 is such that when a positive drive pulse 30 is applied alone from the A drive source 23, a magnetomotive force will be induced in a direction such as to switch the flux in the switching leg 13. The switching flux readily finds closure through the nearest available path by switching the flux in the adjacent switching leg 14a, leaving the flux in the remaining legs including the output leg 16 undisturbed. The sense of each of the drive windings 19a, 19b, 20a, and 20b is such that when a positive current pulse 31 or 32 is applied from either of the B or C drive sources 24 or 25, respectively, magnetomotive forces are developed which merely tend to drive the flux in the coupled switching legs in the direction in which the flux is already saturated. The only effect in either of the latter cases is that the flux is driven further into saturation or "shuttled." Only in the case of an isolated energization of the C drive source 25 will any preceptible effect be caused in the core structure 10. Since the drive winding 20b energized by the C drive source is linked to the flux closed through the output leg 16, the shuttling of the flux in the latter leg will induce an ineffective shuttle signal in the output winding 22. The flux directions in the various legs of the structure 10 after isolated energization of the A drive source 23 is depicted in row II of FIG. 2 by the directional arrows, the positive switching drive pulse input being designated $A_s$ to distinguish it from a negative reset drive pulse input $A_r$ to be described. The arrows 35 through 38 depict the only flux change occurring as a result of the isolated A drive.

Further operations of this invention may conveniently be described within the context of the energization programming of the A, B, and C drive sources necessary to accomplish the selection and pulsing of a magnetic wire memory energizing solenoid such as is shown in the disclosure of Weller referred to. The representative operations described in this connection will also provide an understanding of other and more generalized combinations of operations possible with this invention. In order to select by means of three coincident currents one of a plurality of switching structures 10 which structures may be grouped as suggested above and which may share multiplied drive windings, each of such core structures 10 will have at least one drive applied thereto. A group of the structures 10, including the one selected, will have at least two drives applied thereto, and the selected structure 10 will have a coincidence of all of the applied drives. For purposes of description this sequence of drives may be taken as the A, B, and C drives in that order. Thus, for any selection operation, each switching structure 10 of a group will have an A drive applied thereto, some structures of a group will have an A and B drive applied, and a selected switching structure 10 within a group will have the coincidence of the A, B, and C drives applied thereto. In a sequential selection of particular switching structures 10 in the context assumed, the coincidence of the applied A, B, and C drives follows the coincidence of an applied A and B drive. The latter coincidence follows upon the single application of an A drive.

The effect of the applied single drive A on the flux of a structure 10 in a first of a sequence of selection steps has already been demonstrated above. In the next succeeding selection step, the coincidence of only the A and B drives will be described. Considering first the A drive, it will be seen from an inspection of FIG. 1 that the application of the positive current pulse 30 to the drive winding 17 need merely drive the flux in the switching leg 13 further into saturation in the direction in which the preceding isolated A drive has already driven it. The simultaneously energized B drive source 24 applies a positive current pulse 31 to the drive windings 19a and 19b. The latter pulse generates a magnetomotive force in the switching leg 14b which also need merely drive the flux therein further into saturation. The latter flux may be understood as initially having been closed through the leg 15a. The magnetomotive force generated by the pulse 31 in the drive winding 19a, however, opposes the flux already in the leg 14a, and accordingly applies a switching force against the latter flux. The saturation fluxes in the legs 13 and 14b, however, have pre-empted closure paths in the flux-limited structure such that the flux in each may be understood as closing through the other. The net effect of the A and B drives thus is to reduce the flux in the leg 14a to a magnetic neutrality which is represented in row III by the flux change of the arrow 39. Consistent with the foregoing theoretic explanation of the internal flux behavior of the structure 10, no flux is now closed through the switching leg 15a, which change of condition is represented in row III of FIG. 2 by the arrow 40 as the reversal of part of the flux to leave the leg 15a magnetically neutral. The coincidence of an A and B drive following an isolated A drive thus leaves the flux in the output leg 16 undisturbed. Both of the flux values in either of the legs 15b and 16 may be understood as being closed through the other leg.

The final possibility during a selection sequence in connection with the illustrative memory array assumed is the coincident application of each of the A, B, and C drives following the coincidence of an A and B drive. At this time each of the sources 23, 24, and 25 will be energized and the positive drive current pulses 30, 31, and 32 applied to the drive windings 17, 19a and 19b, and 20a and 20b, respectively. The application of the drive pulses 30 and 31 will have no effect on the legs 13, 14a, and 14b except to drive the flux in the legs 13 and 14b further into saturation and prevent any flux changes in those legs as a result of the B drive in other parts of the structure 10. The flux distribution controlled by the pulses 30 and 31 accordingly remains unchanged as is indicated in row IV of FIG. 2. The positive drive pulse 32 applied to the drive windings from the C drive source 25 develops a magnetomotive force in the winding 20b which need merely drive the flux in the leg 15b further into saturation. The force developed in the winding 20a, however, is in a direction such as to cause a partial flux switching in the leg 15a which change is represented in row IV of FIG. 2 by the arrow 41. The flux in the leg 15b originally closed through the output leg 16 now closes, as a result of the magnetomotive force being applied to the leg 15a and the shorter path presented, through the leg 15a. A flux change accordingly results in the output leg 16 as that leg is reduced to magnetic neutrality to induce an output signal in the coupled output winding 22. This flux change is represented in row IV of FIG. 2 by the arrow 42.

In the foregoing sequence of application of the combinations of A, B, and C drives described, the physical isolation of the output leg 16 from the last of the switching legs 15b advantageously tends to reduce the transmission of "noise" flux changes to the output leg and, therefore the generation of noise signals. Insofar as the foregoing particular illustrative sequence of drives is concerned, the circuit of FIG. 1 would have operated as effectively had the output leg 16 been generally equally spaced with the switching legs 13, 14a, etc. However, in a more generalized situation in which any isolated drive or combination of drives may follow a particular switching operation, the disparity in the lengths of the flux loops is necessitated. Thus, a switching situation may be demonstrated in the manner employed in connection with the illustrative operations described, in which a switching flux in the switching leg 15b has two possible closure paths available thereto: either through the output leg 16 or the farthest removed switching leg 13. In order to insure that no flux change will prematurely occur in the output leg 16 in such an event, a preferential path is presented through the switching leg 13 due to the lower reluctance offered as a result of its shorter length.

The foregoing theoretic explanation of the internal flux behavior has thus been provided to demonstrate the complete isolation of the output leg 16 during the application of any combinations of the A, B, and C drives except the coincidence of all three. On the basis of the same or any other explanation, the flux-limited restrictions of the structure 10 and the physical isolation of the output leg 16 will permit only the coincidence of the described input drives to cause the generation of an output signal. It is, of course, to be understood that this invention is not to be limited to the particular sequence or combinations of drives described above. The previous flux switching history of the structure 10 prior to the application of a coincidence of drives will have no bearing on whether or not an output signal is produced when a coincidence of all three drives does occur. The particular flux distribution resulting from a previous incomplete switching operation, merely determines which of the three input drives is the one which in fact causes the flux change in the output leg 16 to produce an output signal.

The polarity of the output signal generated as the result of a completed switching operation as described above, may obviously be determined by the sense of the output winding 22. This output signal may advantageously be employed as a write signal in connection with the memory array context suggested hereinbefore. A signal of opposite polarity is then generally required to accomplish the interrogation of an associated memory. The latter signal may advantageously be provided as the result of a completed reset operation, which operation may now be described also with reference to the flux distribution table of FIG. 2. The reset operation is performed in a manner similar to that described for the switching phase with the exception that an A reset drive source 27 supplying a negative reset drive current pulse 33 is provided. For the B and C reset drives, the same sources 24 and 25 may advantageously be utilized. Each of the drive windings thus performs a dual function—as drive windings during the switching phase and as reset drive windings during the reset phase. At the initiation of a reset phase the flux distribution as symbolized in row IV of the flux table of FIG. 2 will be assumed. In the reset phase, an illustrative sequence of inputs also organized in connection with the selection of a particular energizing solenoid of a memory array will be further assumed. Thus, the sequence of inputs of a structure 10 during the reset phase will also be: $A_r$ alone, the coincidence of $A_r$ and B, and finally the full coincidence of the $A_r$, B, and C reset drives to produce an output signal.

During an isolated $A_r$ drive input, the application of the negative reset drive signal 33 to the winding 17 generates a magnetomotive force in a direction to switch the flux in the switching leg 13. Since no other drives are being applied at this time closure of this switching flux may be had through the nearest leg which is the leg 14a. Since the latter leg was in a neutral magnetic condition as a result of the previous switching operation, a partial flux switching occurs therein. The flux changes thus resulting are represented by the directional arrows 43, 44, and 45 in row V of FIG. 2. Since the flux in the leg 13 initially closed through the longer path including the leg 14b, the latter leg is now left effectively unmagnetized, which flux change may be understood as the reversal of one of the flux values in that leg and represented in row V by the reversed arrow 46. Since no other drives are being applied no further flux changes occur at this time and the flux in the remaining legs 15a, 15b, and the output leg 16 remain undisturbed. No signal as a result, is generated in the output winding 22. By inspection of the table of FIG. 2, bearing in mind the polarity of the reset drive input pulse 31 and the sense of the windings 19a and 19b, it may readily be determined that an isolated B reset drive will cause a partial switch of flux in the leg 14a to induce a saturation flux in that leg which closes through the adjacent, also driven, leg 14b. The leg 13 would then be left in a magnetically neutral condition. More importantly, the flux closure through the legs 15a and 15b is left undisturbed and no flux change is caused in the output leg 16. In a similar manner, it may be shown that an isolated C reset drive at this time merely has the effect of driving the flux in the legs 15a and 15b further into saturation, again without disturbing the magnetic neutrality of the output leg 16.

The next possible input combination to be considered after the isolated $A_r$ reset drive input, is the coincidence of the $A_r$ and B drives. The $A_r$ drive pulse 33 will act to drive the flux in the leg 13 further into saturation, its closure being unaffected because of the direction of the drive simultaneously being applied by the reset drive pulse 31 on the switching leg 14a. The $A_r$ and B reset drives thus for one thing insure the maintenance of the latter flux closure loop. The simultaneous magnetomotive force being applied through the drive winding 19b on the leg 14b, however, induces a saturation flux in the latter leg which, because of the low reluctance path offered, closes through the leg 15a in the direction such as to link with the remanent flux already in that leg. The resulting flux change in the leg 14b is represented by the reversed arrow 47 in row VI of FIG. 2. Since the remanent flux in the leg 15a now no longer closes through the switching leg 15b, the latter leg is rendered magnetically neutral. The latter flux change is represented by the reversed arrow 48 in row VI of FIG. 2. The flux in the output leg 16 is, as a result of the coincidence of the $A_r$ and B drives alone, again left undisturbed and no output signal is generated.

Following the reset selection step in which the input drives $A_r$ and B are applied to a structure 10 of this invention, an access sequence of an illustrative memory array provides for the next different combination of inputs to constitute the coincidence of all three of the $A_r$, B, and C reset drives. Thus at this time the pulses 33, 31, and 32 are coincidentally applied to the drive windings 17, 19a and 19b, and 20a and 20b. Since the remanent fluxes in the legs 13, 14a, and 14b controlled by the $A_r$ and B drives are already in the direction of the latter drives, only an excursion further into saturation in these legs occurs without a directional change in flux. The effect of the C drive on the flux in the leg 15a is similarly to drive it further into saturation without a directional change. The C drive simultaneously being applied to the switching leg 15b, however, induces a saturation flux in the latter magnetically neutral leg, which flux finds a closure path through the also magnetically neutral output leg 16. Accordingly, a partial flux change occurs in each of the latter legs and an output signal is induced in the output winding 22 coupled to the output leg 16. The latter flux changes are represented by the reversed arrows 49 and 50, respectively, in row VII of the table of FIG. 2. The flux distribution in the core structure 10 after a reset phase of operation as described and as shown in row VII of FIG. 2, is seen to accord precisely with the reset flux distribution initially assumed prior to a switching phase and as shown in row I of FIG. 2.

The output signal generated as a result of a completed reset phase of operation is seen to be opposite in polarity to the output signal generated during a switching phase. Assuming that the sense of the output winding 22 remains the same, this becomes clear from the different directions of the flux change in the output leg 16 in the two operative phases. The output signal generated during a reset phase accordingly may advantageously comprise an interrogation pulse for an energizing solenoid of a memory array of the character suggested hereinbefore for which the output signal generated during the switching phase comprised the write pulse.

Combinations other than and sequences different from the combinations and sequences of the input drives described in the foregoing may also be applied to a structure 10 according to this invention during either a switching or a reset phase of operation. In each case, however, it may be demonstrated in a maner similar to that of the illustrative combinations and sequences selected, that the coincidence of the A, B, and C drives and only that combination of drives will cause an output signal to be generated, and that regardless of the previous switching history of the core structure 10. In each case the distribution of the drive windings and the physical isolation of the output leg from the switching legs prevents any flux change in the output leg unless the proper coincidence of input drives is applied. It is further to be understood that, although the core structure 10 of the illustrative embodiment of this invention of FIG. 1 is shown as providing for three drives, the structure 10 may also be formed so as to make a coincident operation with any desired number of drives possible. It is only necessary to add a pair of switching legs for each coincident drive to be added while maintaining the disparity between the spacing of the switching legs and the spacing between the last of the latter legs and the output leg. The principles of operation and control of the flux distribution are the same in any case.

The organization and operation of a novel coincident drive magnetic switching element has thus been described which element lends itself advantageously as an access circuit element for magnetic memory arrays. As such, a usable output signal is achieved as the result of both a switching and a reset phase of operation, both of which latter operations may be selectively performed by a required coincidence of input drive current pulses. As long as the input drive currents exceed the minimum value necessary to accomplish a flux switching in the legs of the structure 10, a wide variation in the coincident drive currents is permissible and still insures a successful switching or reset operation.

What has been described is considered to be only one illustrative embodiment of this invention. Accordingly, it is to be understood that various and numerous other arrangements and adaptations other than the ones specifically described may be devised by one skilled in the art without departing from the spirit and scope of this invention.

What is claimed is:

1. An electrical control circuit comprising a magnetic structure of a material having a substantially rectangular hysteresis characteristic, said structure presenting a pair of side rails having a plurality of discrete flux switching legs therebetween, said side rails and said switching legs having substantially equal minimum cross-sectional areas, a first drive circuit including a first source of drive pulses and a drive winding coupled to a first one of said flux switching legs in one sense, a second drive circuit including a second source of drive pulses and further including only a drive winding coupled to a second one of said flux switching legs in said one sense and a drive winding coupled to a third one of said flux switching legs in the opposite sense; a third drive circuit including a third source of drive pulses and further including only a drive winding coupled to a fourth one of said flux switching legs in said one sense and a drive winding coupled to a fifth one of said flux switching legs in said opposite sense; an output flux leg between said side rails also having a cross-sectional area substantially equal to the cross-sectional areas of said side rails and said switching legs, and an output winding coupled to said output leg.

2. An electrical control circuit according to claim 1 also comprising a reset drive circuit means including a source of reset pulses and said drive winding coupled to said first one of said switching legs.

3. An electrical control circuit according to claim 2 in which said output flux leg is spaced farther from the switching leg nearest said output flux leg than said last-mentioned switching leg is spaced from the switching leg farthest from said output flux leg.

4. An electrical control circuit comprising a plurality of separate flux switching elements and an output flux element, means for completing flux paths between each of said plurality of flux switching elements and said output flux element, said last-mentioned means, said switching elements, and said output flux element being so dimensioned in cross-sectional areas to have substantially the same flux carrying capacities, said output flux element being spaced from the nearest of said switching elements such that the flux path through said output flux element and said last-mentioned switching element is longer than the longest path between any of said switching elements, each of said plurality of flux switching elements and said output flux element being of a material having substantially rectangular hysteresis characteristics, control means in a first phase of operation comprising a plurality of drive circuits each including a first source of drive pulses, a first of said drive circuits also including a drive winding coupled to a first one of said switching elements in one sense, each of the remaining ones of said drive circuits also including a drive winding coupled to another of said switching elements in said one sense and further including only a drive winding coupled to a succeeding switching element in the opposite sense; and an output winding coupled to said output flux element.

5. An electrical circuit according to claim 4 also comprising control means in a second phase of operation comprising a second source of drive pulses connected to said drive winding coupled to said first one of said switching elements and said last-mentioned control means also comprising each of said remaining ones of said drive circuits.

6. An electrical control circuit comprising a magnetic structure of a material having a substantially rectangular hysteresis characteristic, said structure having a plurality of apertures therein to define a plurality of switching flux legs and an aperture therein larger than the sum of said aforementioned apertures to define an output flux leg, said structure and said apertures being so dimensioned such that all of the flux paths defined in said structure have substantially the same flux carrying capacities, means for causing a flux change in said output flux leg in one direction comprising a first drive circuit including a drive winding coupled to one of said switching flux legs in one sense, a plurality of other drive circuits each including a pair of drive windings coupled only to respective ones of succeeding pairs of said switching legs in opposite senses, and means for coincidentally applying drive pulses of one polarity to each of said drive circuits; and an output winding coupled to said output leg energized responsive to a flux change in said one direction for generating an output signal.

7. An electrical control circuit according to claim 6 also comprising means for causing a flux change in said output leg in the opposite direction comprising said means for coincidentally applying said drive pulses of said one polarity to each of said plurality of other drive circuits and means for coincidentally applying a drive pulse of the opposite polarity to said first drive circuit, said output winding being energized responsive to a change in said opposite direction for generating an output signal of another polarity.

8. An electrical control circuit comprising a magnetic structure of a material having substantially rectangular hysteresis characteristics, said structure presenting a pair of side rails having a plurality of transverse switching legs and an output leg therebetween, said side rails, said switching legs, and said output leg having substantially equal minimum cross-sectional areas, said switching legs forming a plurality of first apertures therein and said output leg forming a second aperture therein having an area substantially larger than the sum of the areas of said first apertures, a first of said switching legs having a drive winding coupled thereto in one sense, each of the remaining of said switching legs having a drive winding coupled thereto in alternating senses, an output winding coupled to said output leg, means including a first pulse source for applying a drive pulse of one polarity to said drive winding coupled to said first of said switching legs in one phase of operation, a plurality of means each also including a first pulse source for applying a drive pulse of said one polarity to only pairs of the remaining drive windings of one and the opposite sense, also in said one phase of operation, and means including a second pulse source for applying a drive pulse of the opposite polarity to said drive winding coupled to said first of said switching legs in a subsequent phase of operation.

9. A coincident drive device comprising a magnetic structure presenting a first, second, and third discrete flux switching leg and a discrete flux output leg, said structure being of a material displaying substantially rectangular hysteresis characteristics and being so dimensioned that all of the flux paths defined in said structure have substantially the same flux carrying capacities, a first drive winding coupled to said first switching leg in one sense, a second drive winding coupled to said second switching leg is said one sense, a third drive winding coupled to said third switching leg in the opposite sense, first control means operative in one phase of operation comprising a first drive circuit including a first source of drive pulses of one polarity and said first drive winding, and a second drive circuit including a second source of drive pulses of said one polarity and only said second and third drive windings; and an output winding coupled to said output leg.

10. A coincident drive device according to claim 9 also comprising a second control means operative in a subsequent phase of operation comprising said second drive circuit and a third drive circuit including a third source of drive pulses of the opposite polarity and said first drive winding.

11. A magnetic control circuit comprising a magnetic structure capable of assuming stable magnetic remanence states, said structure having a plurality of first apertures therein defining a plurality of switching legs and a single second aperture therein having an area larger than the sum of the areas of said first apertures defining an output leg, each of said switching legs, said output leg and connective portions of said structure being flux limited to the same flux magnitude, a plurality of drive windings coupled to said switching legs, said drive windings being interconnected in predetermined combinations and senses, means for selectively energizing said drive windings to induce magnetic fluxes in said coupled switching legs, said combinations and senses being such that a flux induced in any switching leg is closed through another switching leg when said drive windings are energized separately and cause a flux change in at least said output leg when said drive windings are energized coincidentally, and an output winding coupled to said output leg energized responsive to flux changes therein for generating an output signal.

References Cited in the file of this patent

UNITED STATES PATENTS

| | | |
|---|---|---|
| 2,869,112 | Hunter | Jan. 13, 1959 |
| 2,889,542 | Goldner | June 2, 1959 |
| 2,907,988 | Duinker | Oct. 6, 1959 |
| 2,923,923 | Raker | Feb. 2, 1960 |
| 2,963,591 | Crowley et al. | Dec. 6, 1960 |
| 2,978,176 | Lockhart | Apr. 4, 1961 |